United States Patent
Kolk et al.

(10) Patent No.: US 10,077,662 B2
(45) Date of Patent: Sep. 18, 2018

(54) ROTOR FOR A THERMAL TURBOMACHINE

(71) Applicant: Siemens Aktiengesellschaft, Munich (DE)

(72) Inventors: Karsten Kolk, Mulheim a.d. Ruhr (DE); Peter Schröder, Essen (DE); Vyacheslav Veitsman, Gelsenkirchen (DE)

(73) Assignee: Siemens Aktiegesellschaft, Munich (DE)

( * ) Notice: Subject to any disclaimer, the term of this patent is extended or adjusted under 35 U.S.C. 154(b) by 327 days.

(21) Appl. No.: 14/904,500

(22) PCT Filed: Jul. 1, 2014

(86) PCT No.: PCT/EP2014/063914
§ 371 (c)(1),
(2) Date: Jan. 12, 2016

(87) PCT Pub. No.: WO2015/007512
PCT Pub. Date: Jan. 22, 2015

(65) Prior Publication Data
US 2016/0194963 A1    Jul. 7, 2016

(30) Foreign Application Priority Data
Jul. 17, 2013 (EP) .................... 13176860

(51) Int. Cl.
*F01D 5/06* (2006.01)
*F01D 5/08* (2006.01)
(Continued)

(52) U.S. Cl.
CPC .............. *F01D 5/06* (2013.01); *F01D 5/087* (2013.01); *F01D 5/147* (2013.01); *F04D 29/321* (2013.01); *Y02T 50/673* (2013.01); *Y02T 50/676* (2013.01)

(58) Field of Classification Search
CPC . F01D 5/06; F01D 5/066; F01D 5/085; F01D 5/087; F04D 17/02; F04D 29/321; F05D 2240/24
See application file for complete search history.

(56) References Cited

U.S. PATENT DOCUMENTS

| 4,919,590 A | 4/1990 | Stratford et al. |
| 6,808,362 B1 * | 10/2004 | Glahn ............... F04D 29/321 |
| | | 415/115 |

(Continued)

FOREIGN PATENT DOCUMENTS

| CN | 101631932 A | 1/2010 |
| DE | 19617539 A1 | 11/1997 |

(Continued)

OTHER PUBLICATIONS

CN Office Action, dated Jun. 23, 2016, for CN application No. 201480040579.2.

(Continued)

*Primary Examiner* — Justin Seabe
*Assistant Examiner* — Juan G Flores
(74) *Attorney, Agent, or Firm* — Beusse Wolter Sanks & Maire

(57) ABSTRACT

A rotor for a thermal turbomachine, in particular a gas turbine, is designed to conduct a medium, such as compressor air, in the interior of the gas turbine. In order to conduct the medium in the interior with low flow losses and at the same time to specify a rotor that can be produced comparatively simply and economically, a separately produced blade wheel is arranged between the mutually adjacent hub regions of the two rotor discs. The first side of said blade wheel lies against the hub region of the second rotor disc and the second side opposite the first side has a number of ribs, which extend from radially outside to radially inside.

8 Claims, 4 Drawing Sheets

(51) Int. Cl.
*F04D 29/32* (2006.01)
*F01D 5/14* (2006.01)

(56) References Cited

U.S. PATENT DOCUMENTS

| | | |
|---|---|---|
| 2003/0133788 A1 | 7/2003 | Avignon et al. |
| 2010/0166559 A1 | 7/2010 | Ahaus et al. |
| 2010/0266387 A1 | 10/2010 | Bintz et al. |
| 2011/0033303 A1 | 2/2011 | Pegouet |
| 2012/0027606 A1 | 2/2012 | Malmborg |
| 2013/0199207 A1* | 8/2013 | Mane ................ F01D 5/085 60/805 |
| 2016/0195110 A1 | 7/2016 | Kolk et al. |
| 2016/0230773 A1 | 8/2016 | Costamagna et al. |

FOREIGN PATENT DOCUMENTS

| | | |
|---|---|---|
| DE | 19852604 A1 | 5/2000 |
| DE | 198526044 A1 | 5/2000 |
| EP | 1329591 A1 | 7/2003 |
| JP | 2011518983 A | 6/2011 |
| JP | 2016524095 A | 8/2016 |
| JP | 2016164416 A | 9/2016 |

OTHER PUBLICATIONS

JP Office Action dated Dec. 12, 2016, for JP patent applicaiton No. 2016-526499.

* cited by examiner

ROTOR FOR A THERMAL TURBOMACHINE

CROSS REFERENCE TO RELATED APPLICATIONS

This application is the US National Stage of International Application No. PCT/EP2014/063914 filed Jul. 1, 2014, and claims the benefit thereof. The International Application claims the benefit of European Application No. EP13176860 filed Jul. 17, 2013. All of the applications are incorporated by reference herein in their entirety.

FIELD OF INVENTION

The invention relates to a rotor for a thermal turbomachine, which rotor is configured in the interior for conducting a medium.

BACKGROUND OF INVENTION

Rotors for thermal turbomachines such as axial compressors and gas turbines are known in different designs from the comprehensively available prior art. For example, welded rotors are known for gas turbines, in the case of which welded rotors drums of different width are welded to one another to form a monolithic rotor. Secondly, it is known to stack a plurality of disk-shaped elements (also known as rotor disks) and to brace them with the aid of one or more tie rods to form a fixed structure. Even combinations of said designs are known. Rotor blades are mounted on the outside of all rotors, which rotor blades can be assigned in the case of gas turbines, for example, either to the compressor or to the turbine unit. Regardless of the design, a medium can be introduced into the interior of the rotors via holes which are arranged in the rotor shell, in order to conduct said medium from the feed position to a second axial position, where the medium is removed from the rotor again. This method is used, in particular, in gas turbines, in order to remove cooling air from the main flow path of the compressor of a gas turbine on the rotor side and to conduct it to the turbine unit, where, guided out of the rotor interior again, it can be used for cooling air purposes and/or sealing air purposes.

In order to make an aerodynamically efficient removal of air from the compressor of a gas turbine and efficient conducting of the air in the rotor interior possible, different constructions are known.

For example, DE 196 17 539 A1 has disclosed conducting the air which flows with a swirl into the rotor cavity on account of the rotation of the rotor via radially extending ribs to the rotor center. The conducting causes the circumferential speed of the air which exits from the holes to be reduced as the radius becomes smaller, which prevents an impermissibly great swirl formation. For this reason, the ribs are called "deswirlers" in English.

SUMMARY OF INVENTION

It is an object of the present invention to provide an alternative solution, in which firstly the pressure and flow losses in the rotor interior are reduced further and which secondly is a solution which can be produced simply and is therefore inexpensive.

This object of the invention is achieved by way of a rotor in accordance with the features of the independent claim. Advantageous refinements are specified in the dependent claims, the features of which can be combined with one another in accordance with the back-references.

The inventors have recognized that flow losses can occur in the region of the radial ribs in the prior art, since said ribs tend to lie comparatively wide apart from one another in the circumferential direction and there are therefore relatively great flow cross sections at this point for the medium which is removed from the turbomachine. This is all the more true, since the flow passages between the known ribs also have a comparatively great axial extent. In order to eliminate said disadvantage, it is proposed to also axially delimit the flow cross section of the flow passages between the ribs. The axial delimitation is advantageously to be configured at least over a large part of the radial extent of the ribs.

For this reason, a separately manufactured impeller wheel is arranged between the hub regions of mutually adjacent rotor disks, of which one of the two rotor disks has holes for introducing a medium into the rotor interior, the impeller wheel bearing with a first side against the hub region of the second rotor disk, and the second side of said impeller wheel, which lies opposite the first side, having a number of ribs which extend from the outside to the inside.

In contrast to the known solutions, it is therefore firstly proposed by way of the invention that the ribs are not a monolithic part of one of the two rotor disks, but rather are part of an impeller wheel which comprises, as rib carrier, a plate-shaped ring, to which the ribs are fastened.

Therefore, the abovementioned refinement can be manufactured substantially more simply and less expensively than rotor disks, in which the ribs are an integral constituent part of the rotor disk. In addition, the impeller wheel can be manufactured from a different material than the rotor disk itself, since the boundary conditions, for example the maximum use temperatures, can be different. Therefore, the relatively complex geometry of the ribs of a rotor disk is separated from the latter, since it has been recognized by the inventors that the ribs can also be arranged on a separate component, the impeller wheel. The impeller wheel can be manufactured mechanically from a solid ring. As an alternative, the impeller wheel can also be joined from individual parts (a ring and a plurality of ribs) by way of welding. A casting method for manufacturing the impeller wheel may also be suitable in the case of a complex geometry of the rib.

It is to be noted that the terms "axial" and "radial" and "outside" and "inside" always relate to the rotational axis of the rotor disk or the rotor. In addition, the rotor interior is to be understood as that cavity in the interior of the rotor which is delimited by the rotor disks. In other words, the holes of the first rotor disk are not part of the rotor interior.

According to a first advantageous development of the impeller wheel, the outer edge of the rib carrier lies on a greater radius than the outer ends of the ribs, with the result that, in the installed state when the impeller wheel is mounted between the hub regions of the relevant rotor disks, the medium which exits from the holes can be conducted inward in an improved manner on account of the rib carrier which is guided radially further to the outside. Eddies in the inflow regions of the flow passages can therefore be avoided, which reduces pressure losses during the conducting of the medium.

In a further advantageous refinement of the invention, each of the ribs has an edge which faces the first rotor disk and the radial contour of which corresponds to the radial contour of the first rotor disk in the hub region. As a result, the gap between the edges of the ribs and the hub contour of the first rotor disk can be kept comparatively small over the entire radial rib extent, which makes efficient conducting of the medium along the rib possible, without transverse flows occurring through a gap which is formed by the rib and the hub region.

According to a further advantageous refinement, the impeller wheel is secured against a relative movement in the circumferential direction with respect to the second rotor disk. To this end, the impeller wheel can have one or more holes in the rib carrier, in which holes a pin is seated which engages into a groove in the adjacent second rotor disk. As an alternative, the impeller wheel can also be screwed to the second rotor disk.

The impeller wheel is advantageously shrink-fitted on the second rotor disk. To this end, the impeller wheel has an annular bead on its side which faces the second rotor disk, which annular bead projects laterally. Although the side is then no longer completely planar to this extent, it is still ribless. In a corresponding manner to the annular bead, the second rotor disk has a cylindrical, outwardly pointing seat in the hub region, onto which seat the annular bead can be shrink-fitted. The shrink fit affords simple and reliable fastening. In order to avoid a wear-causing relative movement between the second rotor disk and the impeller wheel, cams can be arranged on the one of the two components involved in the shrink fit, which cams engage as far as possibly in a positively locking manner into recesses which are arranged on the other of the two components of the shrink fit. Instead of the positively locking cam/recess pairing, other securing means against relative movements can also be used, such as a securing screw.

The development is particularly advantageous, in which the impeller wheel is of hollow channel-like configuration on the second side radially on the inside between the ribs in order to deflect a flow. This reduces the aerodynamic losses in the medium when it has to be deflected from a mainly radially directed flow into a mainly axially directed flow direction. It goes without saying that this also applies to a reversed flow direction.

A plurality of advantages arise overall by way of the invention: first of all, the simplification of the manufacture, that is to say the reduction of potential manufacturing faults, can be specified by way of a reduction of the component complexity. In addition, the complex geometries are no longer arranged on the comparatively more expensive components, the rotor disks, but rather are realized on a separately manufactured component, the impeller wheel. In addition, the separation of the complex geometries leads to a cost reduction of that rotor disk, by way of which the removal of the medium from the main flow path is realized. The other, second rotor disk can be of classic configuration, since the impeller wheel assumes the function of the improved flow conducting in the interior of the rotor. As a result of the structural separation, different materials can be used and combined.

Therefore, the invention relates overall to a rotor for a thermal turbomachine, in particular a gas turbine, which rotor is configured to conduct a medium, for example compressor air, in its interior. In order to conduct said medium in the interior with low flow losses and in order at the same time to specify a rotor which can be manufactured relatively easily and inexpensively, it is provided that a separately manufactured impeller wheel is arranged between the mutually adjacent hub regions of the two rotor disks, the planar, first side of which bears against the hub region of the second rotor disk, and the second side of which, which lies opposite the first side, has a number of ribs which extend from the outside towards the inside.

Further advantages and features of the invention will be explained using a single exemplary embodiment.

DETAILED DESCRIPTION OF INVENTION

Identical features are provided with the same designations in all figures.

Figure 1:
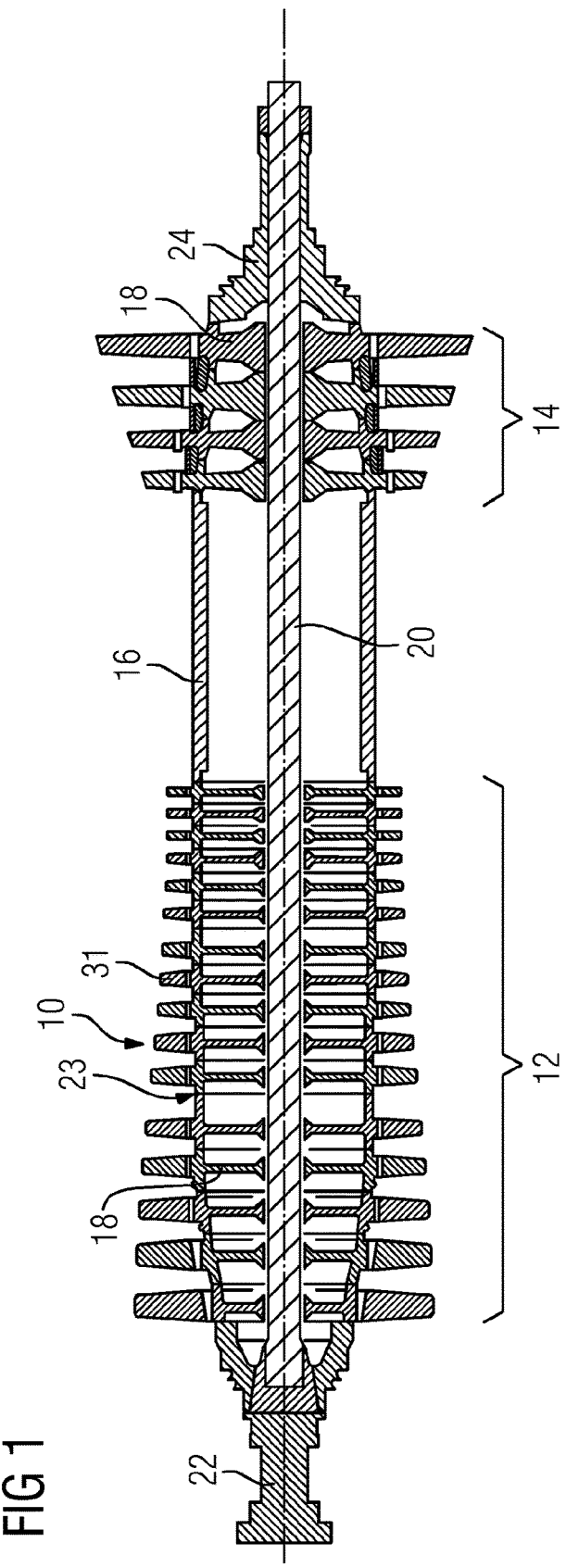
FIG. 1 shows a longitudinal section through a rotor of a turbomachine.

FIG. 1 shows the principal diagrammatic construction of a rotor 10 of a thermal turbomachine which, in the assembled state, is mounted such that it can be rotated about its rotational axis 13. In the exemplary embodiment which is shown, this is the rotor 10 of a stationary gas turbine. The rotor 10 might also be used in an aircraft gas turbine. On account of the use in a gas turbine, the rotor 10 comprises a compressor section 12 and a turbine section 14. A tube 16 is provided between the two sections 12, 14. Both the compressor section 12 and the turbine section 14 are of disk-type design. In the exemplary embodiment which is shown, the compressor section 12 comprises sixteen rotor disks 18 and the turbine section 14 comprises four rotor disks 18. A tie rod 20 extends through all rotor disks 18 and the tube 16, onto the two ends of which tie rod 20 what is known as a front hollow shaft 22 and what is known as a rear hollow shaft 24 are screwed. The two hollow shafts 22, 24 brace all the rotor disks 18 and the tube 16 with one another, with the result that relative movements in the circumferential direction are avoided as far as possible. In detail, this is by way of Hirth toothing systems which are arranged on the contact faces 23. They are not shown in further detail, however.

Figure 2:
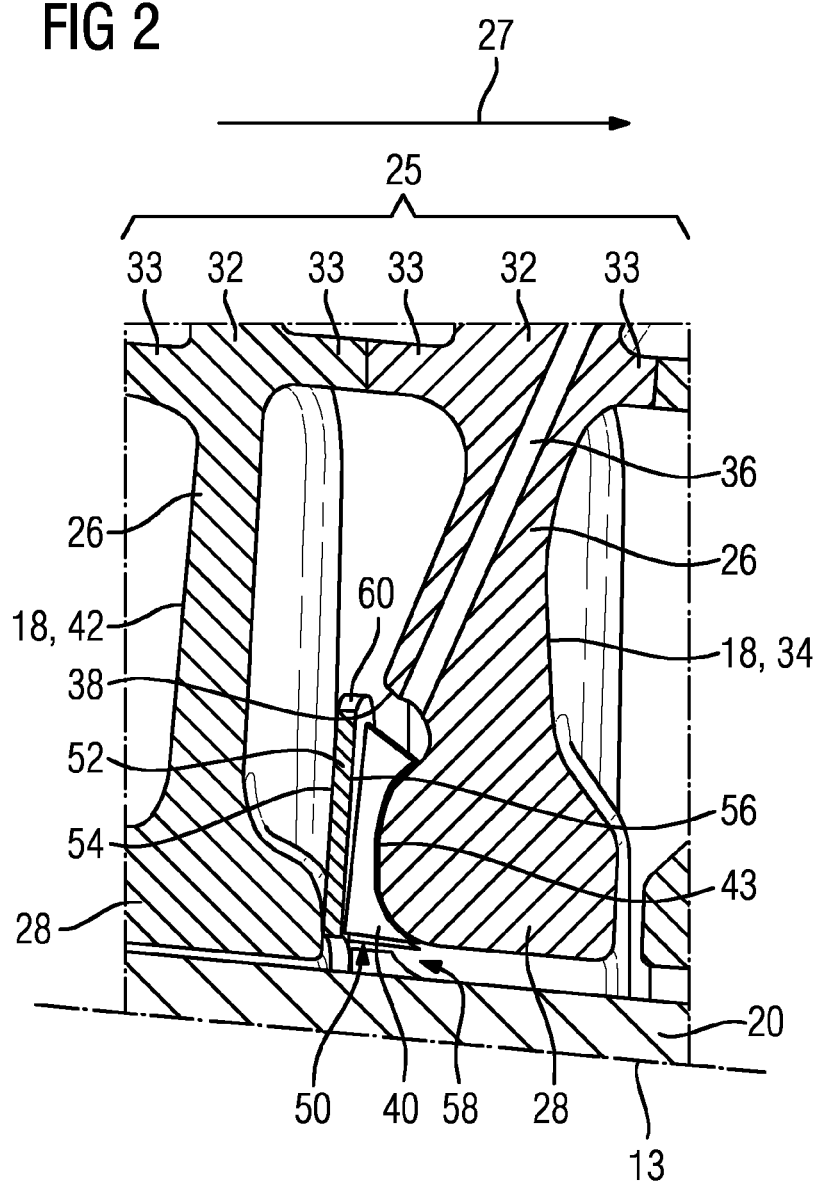
FIG. 2 shows a detail through the longitudinal section of a rotor according to the invention of a turbomachine with an impeller wheel which is arranged between two rotor disks.

The features according to the invention are not shown in FIG. 1. Reference is made in this regard to FIG. 2 which shows a detail of two arbitrary rotor disks 18 of the compressor section 12 from FIG. 1 which form a disk pair 25, however, on an enlarged scale.

In the operating state, air flows as a medium outside the rotor 10 in a main flow path (not shown in further detail) in the arrow direction 27, which air is compressed during this by the compressor.

Each rotor disk 18 has a disk web 26 which runs endlessly about the rotational axis 13. At its radially inner end, the disk web 26 has a hub region 28 with a central opening 30 which is concentric with respect to the rotational axis and, at its radially outer end, a rim region 32. The rim region serves to fasten rotor blades 31 (FIG. 1) and comprises collars 33 which are arranged on both sides and on which the adjacent rotor disks 18 bear against one another. The rotor disk 18 which is shown on the right-hand side in FIG. 2 is called the first rotor disk 34 in the following text, and the rotor disk which is shown on the left-hand side is called the second rotor disk 42. In addition, the first rotor disk 34 has holes which extend inward through the disk web 26 from the rim region and are distributed uniformly along the circumference of the disk web 26. Merely one of the holes is shown and is labeled with the designation 36. The holes 36 are inclined with respect to the radial direction in such a way that they penetrate the disk web 26 from one side to the other side. The holes 36 open with their radially inner end in a ring face 38 which is arranged obliquely with respect to the radial direction of the rotor disk 34.

Figure 3:
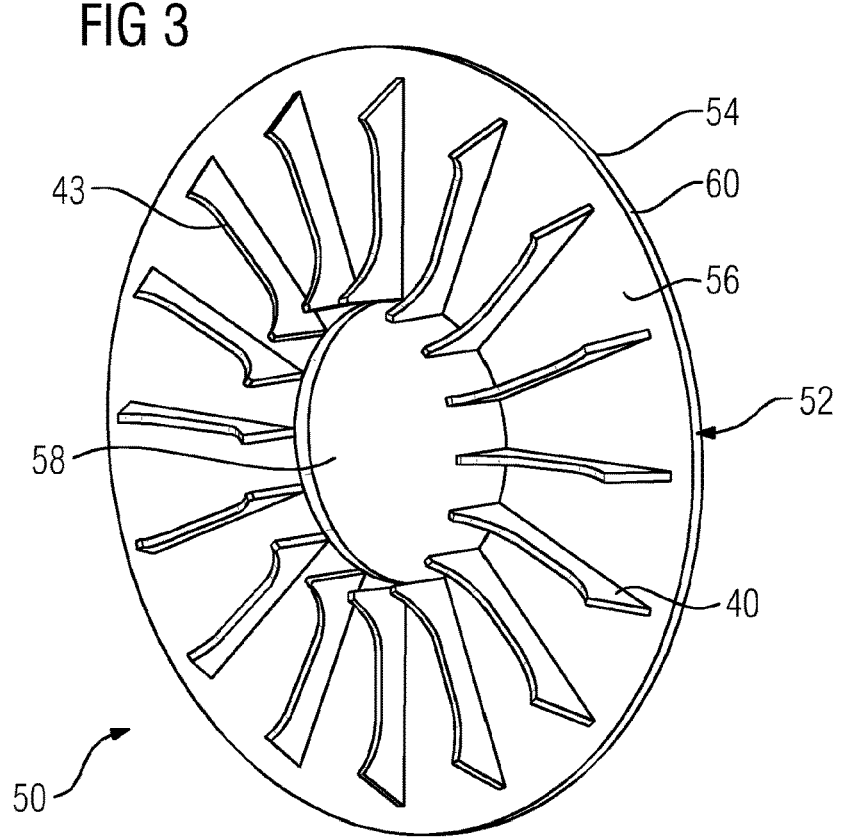
FIG. 3 shows the impeller wheel in a perspective illustration.
Figure 4:
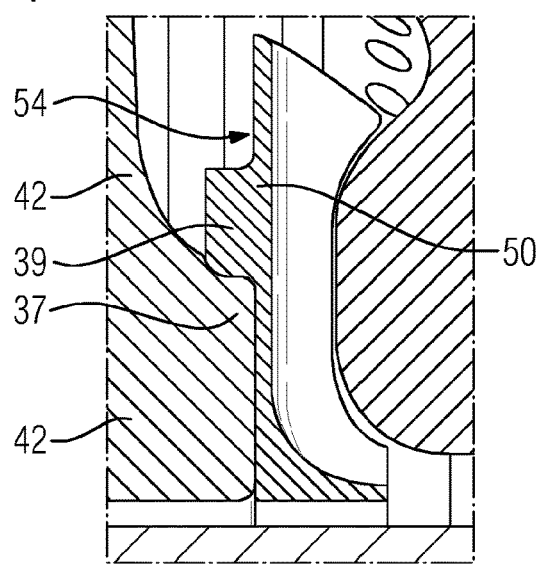
FIG. 4 shows a shrink fit of the impeller wheel on the second rotor disk in cross section.
Figure 5:
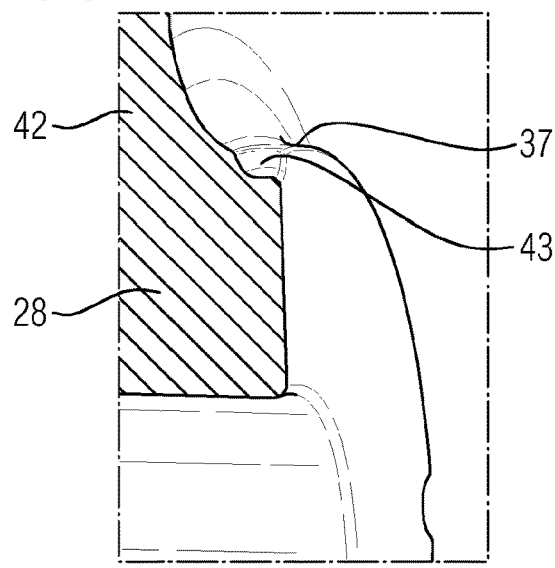
FIG. 5 shows a detail from the hub region of the second rotor disk in a sectioned, perspective illustration.
Figure 6:
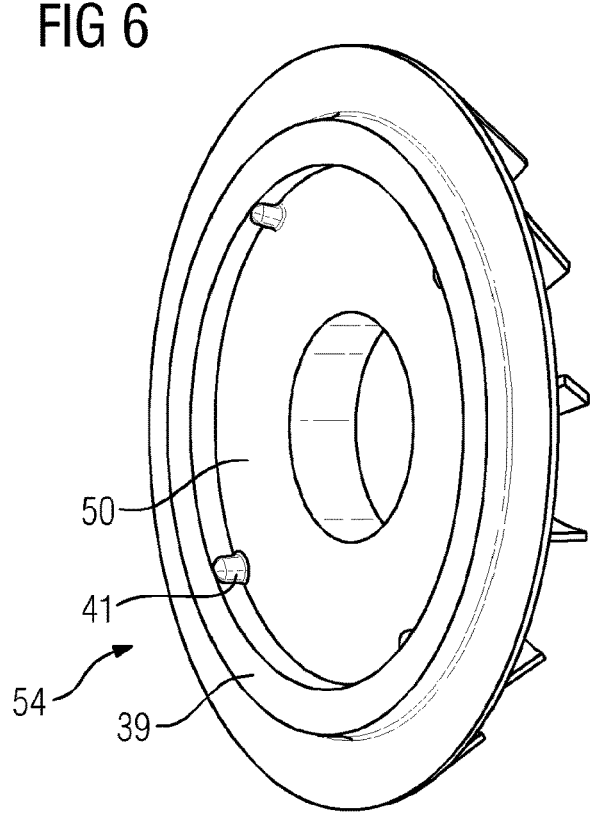
FIG. 6 shows the rear side of the impeller wheel in a perspective illustration.

An impeller wheel 50 is arranged between the two hub regions 28 of the immediately adjacent rotor disks 34, 42. The impeller wheel 50 comprises a plate-shaped rib carrier 52 with a first side 54 which is of approximately planar configuration and with a second side 56 which lies opposite the first side 54. As shown in FIG. 4, the impeller wheel 50 is seated on a cylindrical section 37 of the hub region 28 of the second rotor disk 42. To this end, the impeller wheel 50 comprises an annular bead 39 on its first side 54, which annular bead 39 is shown completely in FIG. 6. According to the exemplary embodiment which is shown, four cams 41 which are distributed uniformly along the circumference are provided on the inner side of the annular bead 39. Said cams 41 engage into recesses 43 (FIG. 5) when the impeller wheel 50 is shrink-fitted, which recesses 43 are open, in the hub region 28 of the second rotor disk 42, both radially to the outside and also laterally, but not in the circumferential direction. At the same time, that area of the first side 54 which is arranged within the annular bead 39 bears flatly against the lateral hub region 28. The impeller wheel 50 is therefore shrink-fitted only partially Ribs 40 (FIG. 3) are distributed uniformly along the circumference on the second side 56. Said ribs 40 serve as guiding elements for air which exits from the holes 36. Here, they can extend rectilinearly or else in a slightly curved manner from the outside toward the inside in the radial direction or else in a slightly inclined manner with respect thereto. Each edge 43 of the ribs 40 which faces the hub region 28 of the first rotor disk 34 is contoured in such a way that its radial contour corresponds to the radial contour of the first rotor disk 34. Nevertheless, there is in each case a slight gap between the edges 43 and the hub region 28, in order to prevent wear. Just like the other rotor disk 18, the impeller wheel 50 also has a central opening 58, through which the tie rod 20 can extend.

The ribs 40 are configured in such a way that they end radially on the outside immediately within the ring face 38. In order to ensure an inflow which is permissible and exhibits low flow losses of the air which exits from the holes 36 into the flow passages which exist between the ribs 40, the outer edge 60 of the rib carrier 52 lies on a greater radius than the outer ends of the ribs 40, in relation to the rotational axis 13.

The ribs 40 serve for flow guidance and to deswirl the air which flows from the holes 36 and is to flow into the interior of the rotor 10. That side of the first rotor disk 34, on which the ribs 40 are provided, is adjoined by a second rotor disk 42. On account of the use of the impeller wheel 50, the second rotor disk 42 can be of conventional configuration in the hub region 28.

As a result of the use of the impeller wheel 50, the flow passages can be delimited axially over the entire radial extent of the ribs 40, in which the cooling air which exits from the holes 36 enters and is conducted as far as the tie rod 20. This avoids swirling of the air at the inlet of each flow passage, which improves the efficiency of the air conducting.

Since the central openings 30 of the rotor disks 18 are larger than the diameter of the tie rod 20, annular spaces are formed between the respective hub regions 28 and the tie rod 20, through which annular spaces the air which is conducted to the tie rod 20 can be conducted in the axial direction along the tie rod 20 from the compressor section 12 to the turbine section 14.

It goes without saying that the above-described disk pair 25 with the impeller wheel 50 which is connected in between can also be used to conduct the air which is conducted along the tie rod 20 toward the outside, as is necessary in the case of rotor disks 18 in the turbine section 14.

The invention claimed is:

1. A rotor for a thermal turbomachine, comprising:
at least one pair of immediately adjacent rotor disks,
each rotor disk having a disk web which runs endlessly around its rotational axis and, at its radially inner end in relation to the rotational axis, has a hub region which is widened axially with respect to the disk web with a central opening which is concentric with respect to the rotational axis, and which has, at its radially outer end, an axially widened rim region for bearing against the adjacent rotor disk and for receiving rotor blades,
wherein the first of the two rotor disks having a multiplicity of bores which are distributed along the circumference, extend inward from the rim region, penetrate the disk web, and open in a ring face of the rotor disk, which ring face is arranged obliquely with respect to the radial direction, and
an impeller wheel arranged between the mutually adjacent hub regions of the two rotor disks, the first side of which impeller wheel bears against the hub region of the second rotor disk, and the second side of which impeller wheel which lies opposite the first side has a number of ribs which extend radially inward from the radial outside.

2. The rotor as claimed in claim 1,
wherein the impeller wheel comprises a plate-shaped rib carrier, the outer edge of which lies on a larger radius than the outer ends of the ribs.

3. The rotor as claimed in claim 1,
wherein each of the ribs has an edge which faces the first rotor disk and the radial contour of which corresponds to the radial contour of the first rotor disk.

4. The rotor as claimed in claim 1,
wherein the impeller wheel is fastened to the second rotor disk.

5. The rotor as claimed in claim 4,
wherein the impeller wheel is fastened to the second rotor disk via a shrink fit.

6. The rotor as claimed in claim 4,
wherein the impeller wheel is secured against a relative movement in the circumferential direction with respect to the second rotor disk.

7. The rotor as claimed in claim 6,
wherein the second rotor disk has at least one recess which is delimited on the circumferential side in the hub region, into which recess a cam engages which corresponds to it and is arranged on the impeller wheel.

8. The rotor as claimed in claim 1, wherein the impeller wheel is of hollow channel-like configuration on the second side radially on the inside between the ribs in order to deflect a flow.

* * * * *